United States Patent [19]
Roth

[11] Patent Number: 5,889,084
[45] Date of Patent: Mar. 30, 1999

[54] UV OR VISIBLE LIGHT INITIATED CATIONIC CURED INK FOR INK JET PRINTING

[75] Inventor: Joseph D. Roth, Springboro, Ohio

[73] Assignee: NCR Corporation, Dayton, Ohio

[21] Appl. No.: 792,827

[22] Filed: Jan. 30, 1997

[51] Int. Cl.⁶ .................................................. C09D 11/10
[52] U.S. Cl. ............................................................ 523/161
[58] Field of Search .............................................. 523/161

[56] References Cited

U.S. PATENT DOCUMENTS

| | | |
|---|---|---|
| 3,465,350 | 9/1969 | Kuer et al. . |
| 3,465,351 | 9/1969 | Keur et al. . |
| 3,663,278 | 5/1972 | Blose et al. . |
| 3,876,432 | 4/1975 | Carlick ..................... 522/103 |
| 4,104,143 | 8/1978 | Wasilewski ............... 522/137 |
| 4,131,529 | 12/1978 | Osterloh ..................... 522/96 |
| 4,258,367 | 3/1981 | Mansukhani . |
| 4,593,051 | 6/1986 | Koleske ..................... 522/77 |
| 4,680,368 | 7/1987 | Nakamoto et al. . |
| 4,923,749 | 5/1990 | Talvalkar . |
| 4,950,696 | 8/1990 | Palazotto et al. . |
| 5,036,112 | 7/1991 | Dougherty ................. 522/31 |
| 5,200,438 | 4/1993 | Fuji et al. . |
| 5,270,368 | 12/1993 | Lent et al. . |
| 5,391,685 | 2/1995 | Hitomi et al. . |
| 5,437,964 | 8/1995 | Lapin et al. . |
| 5,491,178 | 2/1996 | Swedo ....................... 522/74 |
| 5,500,040 | 3/1996 | Fujinami . |
| 5,514,727 | 5/1996 | Green ........................ 522/79 |
| 5,565,246 | 10/1996 | Hyde ......................... 522/90 |
| 5,641,346 | 6/1997 | Mantell ..................... 522/54 |

*Primary Examiner*—Paul R. Michl
*Attorney, Agent, or Firm*—Richard J. Traverso

[57] ABSTRACT

An ink composition suitable for use in ink jet printing is provided which is curable by UV radiation or visible light. The ink composition forms chemically resistant and smear resistant printed images and comprises a cationically photoreactive monomer or oligomer selected from epoxy monomers, epoxy oligomers, vinyl ether monomers and/or vinyl ether oligomers, a cationic photoinitiator and a coloring agent. Also provided are ink jet printers, ink jet printing processes and imaged substrates which employ such an ink composition.

3 Claims, No Drawings

UV OR VISIBLE LIGHT INITIATED CATIONIC CURED INK FOR INK JET PRINTING

BACKGROUND OF THE INVENTION

The invention generally relates to ink compositions for ink jet printers. More particularly, the invention relates to utilizing an ultraviolet light or visible light sensitive ink for jet printing.

Ink jet printing has experienced a significant increase in use in recent years displacing other printing methods due to reduced cost and improvements in print speed and print resolution and the ability to print continuously variable data at high speed through computer control. There are two major categories of ink jet printing—"Drop-on-Demand" and "continuous" ink jet printing. For continuous ink jet, a conducting ink is supplied under pressure to an ink nozzle and forced out through a small orifice. Prior to passing out of the nozzle, the pressurized ink stream proceeds through a ceramic crystal which is subjected to an electric current. This current causes a piezoelectric vibration equal to the frequency of the AC electric current. This vibration, in turn, generates the ink droplets from the unbroken ink stream. The ink stream breaks up into a continuous series of drops which are equally spaced and of equal size. Surrounding the jet, at a point where the drops separate from the liquid stream in a charge electrode, a voltage is applied between the charge electrode and the drop stream. When the drops break off from the stream, each drop carries a charge proportional to the applied voltage at the instant at which it breaks off. By varying the charge electrode voltages at the same rate as drops are produced it is possible to charge every drop to a predetermined level. The drop stream continues its flight and passes between two deflector plates which are maintained at a constant potential. In the presence of this field, a drop is deflected towards one of the plates by an amount proportional to the charge carried. Drops which are uncharged are undeflected and collected into a gutter to be recycled to the ink nozzle. Those drops which are charged, and hence deflected, impinge on a substrate traveling at a high speed at right angles to the direction of drop deflection. By varying the charge on individual drops, the desired pattern can be printed.

In a typical "Drop-on-Demand" ink jet printing process, a fluid ink is typically forced under pressure through a very small orifice of a diameter typically about 0.0024 inches in the form of minute droplets by rapid pressure impulses. The rapid pressure impulses are typically generated in the print head by either expansion of a piezoelectric crystal vibrating at a high frequency or volatilization of a propellant within the ink by rapid heating cycles. The piezoelectric crystal expansion causes the ink to pass through the orifice as minute droplets in proportion to the number of crystal vibrations. Thermal ink jet printers employ a heating element within the print head to volatilize a propellant and form droplets in proportion to the number of on-off cycles for the heating element. The ink is forced out of the nozzle when needed to print a spot on a substrate as part of a desired image. The minute droplets may be energized to achieve an electrical charge and deflected as in the continuous ink jet printing. Conventional ink jet printers are more particularly described in U.S. Pat. No. 3,465,350 and U.S. Pat. No. 3,465,351.

Another type of ink jet printing process is an electrostatic ink jet process which employs an electrostatic field to draw the ink through the nozzle to the substrate. Charged ink droplets are drawn to an oppositely charged platen behind the receiving substrate. Such devices have been developed by Technology International Corp. of Boulder, Colo., under the tradename ESIJET™.

To operate satisfactorily within an ink jet printer, the ink has many requirements, the ink must exhibit low viscosity values typically below 20 centipoise at 25° C., contain no large particulate matter (typically below 5 $\mu$m), and be sufficiently stable so as not to dry and clog the ink jet orifice over short periods of time when not in use. For "continuous" ink jet printing, the ink must be conductive with a resistivity value typically below 10,000 ohms and the unused ink must be recyclable. Secondary factors must also be considered, such as avoiding the generation of flammable vapors during use and minimizing the impact on the environment. Conventional inks which meet these criteria typically do not provide images or indicia with high smear resistance and high chemical resistance. Jet printing inks with improved resistance to handling (smearing) and chemicals are desired.

Inks which provide high smear resistance and high chemical resistance are known. However, these inks are commonly used in other printing methods such as screen printing and lithography techniques for printed circuit boards. These inks typically do not have the low viscosity requirements and/or other requirements of inks used in modem ink jet printers. An example of an ultraviolet light cured ink said to be useful for screen printing and resistant to chemicals and smear is disclosed in U.S. Pat. No. 5,200,438. This ultraviolet ray-curable ink formulation employs a relatively high molecular weight polymer having a rubbery elastomeric structure as a reactive compound.

Other ultraviolet radiation curable inks are known and most comprise a reactive oligomer, a reactive monomer, a photoinitiator, a pigment and optional additives. Of the various types of ultraviolet light curable inks which are known, most find use in screen printing methods, examples being those described in U.S. Pat. No. 5,200,438, discussed above, as well as U.S. Pat. Nos. 5,391,685, 4,680,368 and 5,500,040. A UV curable ink said to be suitable for ink jet printing is described in U.S. Pat. No. 4,258,367. This ink comprises a diazonium compound or derivative thereof as the UV active component. The diazonium compound changes color upon exposure to UV light and becomes visible. These inks do not contain a binder for a pigment or dye which provides resistance to handling (smear) and chemicals.

An etch resistant UV curable ink jet printing ink used to prepare printed circuit boards is described in U.S. Pat. No. 5,270,368. This ink is based on acrylate components and it is said this ink provides excellent adhesion to metal substrates. It is desirable to provide other UV curable ink jet inks with alternative property profiles, such as being well suited for printing on paper and incorporating pigments therein.

SUMMARY OF THE INVENTION

The general objective of this invention is the achievement of an improvement in the smear and chemical resistance of ink jet printing, particularly on paper substrates.

A specific object of this invention is to provide a printing ink for an ink jet printing with improved resistance to chemicals and handling (smear).

Another object of this invention is to provide imaged substrates, particularly non-metal substrates, with an image obtained by ink jet printing using a printing ink of the present invention.

Additional objects of the present invention are to provide an ink jet printer and ink jet printing process which employ a printing ink of the present invention.

The present invention realizes a marked increase in the smear resistance and chemical resistance in printing from ink jet printers through the use of an ultraviolet light or visible light curing printing ink. This printing ink comprises at least one reactive monomer selected from epoxy monomers and vinyl ether monomers, a photoinitiator and at least one colorant selected from pigments and dyes.

The imaged substrate comprises a surface and an image printed thereon by ink jet printing. These images comprise a coloring agent bound to the substrate by a binder which comprises an ultraviolet light or visible light cured polymer of epoxy monomers, epoxy oligomers, vinyl ether monomers and/or vinyl ether oligomers.

The ink jet printer of the present invention comprises a print head which generates a stream of ink droplets and directs these droplets to a substrate at a desired location to form an image. The improvement in this printer comprises the use of the printing ink of this invention.

The printing inks of the present invention cure by a UV or visible light induced cationic curing mechanism and not a free-radical curing mechanism. The use of a UV or visible light induced cationic curing mechanism provides the following advantages:

1. The polymerization is typically uninhibited by oxygen, unlike free-radical cures.
2. The polymerization typically has no volatile byproducts which can represent health hazards and/or produce an unpleasant odor.
3. The polymerization, once activated, typically continues for some time in the absence of light (dark cure).
4. All of the polymerization medium (ink) can typically be used to make the final image. No solvents are needed to evaporate after application of the ink to the receiver sheet (100% solids inks).
5. The polymerization medium is very stable in the absence of light and typically can have a shelf life of years if stored in a light free environment.

DETAILED DESCRIPTION OF THE INVENTION

The ultraviolet radiation or visible light curing ink of this invention may generally be comprised of the following components:

1. Photopolymerizable monomers and oligomers selected from
   a. epoxy monomers and oligomers and/or
   b. vinyl ether monomers and oligomers
2. Optionally alcohols
3. One or more cationic photoinitiators
4. Optionally a photosensitizer
5. One or more colorants selected from pigments and dyes.
6. Optionally, performance additives such as pigment dispersants and defoamers.
7. Optionally, propellant (for thermal ink jet print heads only) such as volatile solvents.

The photopolymerizable monomers and oligomers are selected from epoxy monomers and oligomers, vinyl ether monomers and oligomers and combinations thereof known to undergo cationic polymerization. Conventional epoxy monomers and oligomers which have at least one oxirane moiety of the formula

a viscosity below 500 cps (at 25° C. and in the absence of solvent) and undergo cationic polymerization are preferred.

Conventional vinyl ether monomers and oligomers which a) have at least one vinyl ether group —O—CR'=CRH, wherein R and R' are each, independently, H or $C_{1-8}$-alkyl, b) have a viscosity below 500 cps (at 25° C. and in the absence of solvent) and c) undergo cationic polymerization, are suitable. Suitable vinyl ether monomers and oligomers vary widely in structure and performance. Those with vinyl ether groups where both R and R'=H are preferred. Epoxy monomers and oligomers and vinyl ether monomers and oligomers with two or more reactive groups can be used to increase crosslinking. Mixtures of epoxy and vinyl ether monomers and oligomers may also be used.

Examples of suitable epoxy monomers and oligomers include the "1,2-cyclic ethers" disclosed in U.S. Pat. No. 5,437,964 and those described in "Ring-Opening Polymerizations", Vol. 2, by Frisch and Reegan, Marcel Dekker, Inc. (1969). Suitable epoxies are aliphatic, cycloaliphatic, aromatic or heterocyclic and will typically have an epoxy equivalency of from 1 to 6, preferably 1 to 3. Suitable examples include propylene oxide, styrene oxide, vinylcyclohexene oxide, vinylcyclohexene dioxide, glycidol, butadiene oxide, diglycidyl ether of bisphenol A, oxetane, octylene oxide, phenyl glycidyl ether, 1,2-butane oxide, cyclohexeneoxide, 3,4-epoxycyclohexylmethyl-3,4-epoxycyclohexanecarboxylate, 3,4-epoxy-6-methylcyclohexylmethyl-3,4-epoxy-6-methylcyclohexanecarboxylate, bis(3,4-epoxy-6-methylcyclohexylmethyl)adipate, dicyclopentadiene dioxide, epoxidized polybutadiene, 1,4-butanediol diglycidyl ether, polyglycidyl ether of phenolformaldehyde resole or novolak resin, resorcinol diglycidyl ether, epoxy silicones, e.g., dimethylsiloxanes having cycloaliphatic epoxide or glycidyl ether groups, aliphatic epoxy modified with propylene glycol and dipentene dioxide.

A wide variety of commercial epoxy resins are available and listed in "Handbook of Epoxy Resins" by Lee and Neville, McGraw Hill Book Company, New York (1967) and in "Epoxy resin Technology" by P. F. Bruins, John Wiley & Sons, New York (1968) as indicated in U.S. Pat. No. 4,950,696 issued Aug. 21, 1990 with inventors Palazotto et al.

Preferred epoxies include:

(1) monofunctional epoxy monomers/oligomers such as epoxy grafted polyesters (Vikopol 24, Vikopol 26 by Elf Atochem), cycloaliphatic monoepoxies, such as those of the formulae

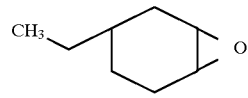

and

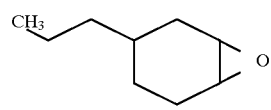

and mixtures of cycloaliphatic monoepoxies available from Union Carbide under the tradename UVR 6100 having an epoxy equivalent weight of 130 to 140, limonene monoxide, epoxidized alpha olefins of the formula

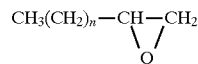

when n=1–30$^+$, silicone epoxy oligomers, alpha pinene oxide, and the like;

(2) bifunctional monomers such as limonene dioxide, bisphenol-A epoxy, cycloaliphatic diepoxides such as bis(3,4-epoxycyclohexyl)adipate of formula (a)

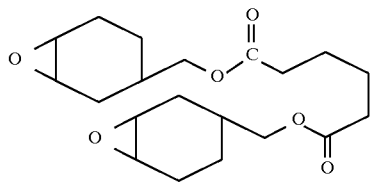

and 3,4-epoxycyclohexylmethyl-3,4-epoxycyclohexane carboxylate (commercially available from Union Carbide under the tradename Cyracure® and from Sartomer under the tradename Sarcat® of formula (b)

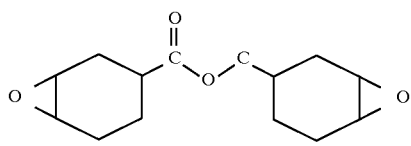

and the like; and (3) polyfunctional monomers such as epoxidized soybean oil, linseed fatty acid esters and the like.

Vinyl Ether Monomers

Examples of suitable monomers and oligomers having at least one or more vinyl ether groups include those disclosed in U.S. Pat. No. 4,950,696 and those of the following general formula:

$$(RCH=CR'-O-Z')_n-B$$

where

R and R' are each, independently H or $C_{1-8}$ alkyl,

Z' is a direct bond or a divalent moiety having $C_{1-20}$ carbon atoms selected from the group consisting of alkylene, cycloalkylene, or polyalkylene ether moieties, n is an integer from 1 to 4, B is hydrogen or a moiety derived from aromatic and aliphatic hydrocarbons, alcohols, cycloaliphatic hydrocarbons, esters, ethers, siloxanes, urethanes, and carbonates, of from 1 to 40 carbon atoms.

Monofunctional monomers are those which have n=1, while the multifunctional monomers are those which have n=2 to 4.

Suitable vinyl ether monomers can also be defined by the following specific formulae:

a) Vinyl ether terminated aliphatic monomers of the formula $$M_2\text{-}(\text{-}(-OZ-)_m-OCR'=CHR)_n$$

where n is 1 to 4, m is 0 to 5, and $M_2$ is a mono, di, tri, or tetra functional aliphatic or cycloaliphatic moiety having from 4–40 carbon atoms;

Z is a divalent moiety having $C_{1-20}$ carbon atoms selected from the group consisting of alkylene, cycloalkylene or polyalkylene moieties, and R and R' are each, independently, H or $C_{1-8}$ alkyl.

Preferred are mono and difunctional vinyl ethers based on normal alkanes having the general formula:

$$CHR=CR'-O(CH_2)_y-R'',$$

wherein y=1 to 18

R=—H, or $C_{1-8}$ alkyl

R'=—H, or $C_{1-8}$ alkyl

R''=—H, —OH, or —O—CR'=CHR; mono and difunctional vinyl ethers based on ethylene glycol having the general formula:

$$CHR=CR'-(OCH_2CH_2)_y-R'',$$

wherein y=1 to 6 and

R, R' and R'' are as defined above; and mono and difunctional vinyl ethers based on 1,3-propanediol and 1,4-butanediol having the general formula:

$$CHR=CR'-(O(CH_2)_x)_y-R'',$$

wherein x=3 or 4 y=1 to 6 and

R, R' and R'' are as defined above.

b) Vinyl ether terminated ester monomers of the formula

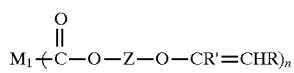

where n is 1 to 4, $M_1$ is a mono, di, tri, or tetra functional moiety having from 1–15 carbon atoms selected from the group consisting of alkylene, arylene, aralkylene and cycloalkylene moieties, Z is a divalent moiety having $C_{1-20}$ carbon atoms selected from the group consisting of alkylene, cycloalkylene, or polyalkylene ether moieties, R and R' are each, independently, a monovalent moiety selected from the group consisting of H and alkyl groups having 1–8 carbon atoms.

c) Vinyl ether terminated ether monomers derived from ether compounds such as HO—$[CH_2CH_2O]_m$H, wherein m is 2–5.

d) Vinyl ether terminated aromatic monomers of the formula $$M_3\text{-}(-OZ-OCR'=CHR)_n$$

where n is 1 to 4, and $M_3$ is a mono, di, tri, or tetrafunctional aromatic moiety having 6 to 40 carbon atoms; and Z, R' and R'' are as defined above.

e) Vinyl ether terminated siloxane monomers of the formula $$(RCH=CR'O-Z')_n-A,$$

wherein

A is a polysiloxane with from 4 to 15 silicon atoms;

n=1–4 and

R, R' and Z' are as defined above.

f) Vinyl ether terminated carbonate monomers of the formula

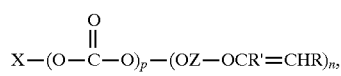

wherein
  x is a diester, diol or polyol moiety of from 2 to 20 carbon atoms,
  n is 1–4,
  p is 0 to 3, and
  R, R' and Z are as defined above.

Specific vinyl ethers which are suitable include a) bisphenol A derivatives and other aromatic vinyl ethers of the formulae (1) and (2):

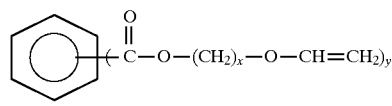

where
  x is 2 or 4,
  y is 2 or 3;

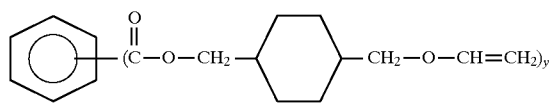

where y is 2 b) ester derived divinyl ethers of the formulae (3) and (4):

$$CH_2=CH-O-(CH_2)_y-O-\overset{O}{\overset{\|}{C}}-(CH_2)_x-\overset{O}{\overset{\|}{C}}-O-(CH_2)_y-O-CH=CH_2 \qquad (3)$$

where
  x is 2, 3, or 4,
  y is 2 or 4; and

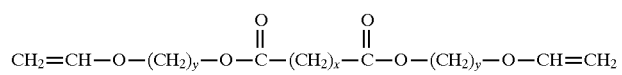

where
  x is 2, 3, or 4 c) cycloaliphatic diol derived vinyl ethers of formula (5):

$$CH_2=CH-O-CH_2-\bigcirc-CH_2-R''' \qquad (5)$$

wherein R''' is H, OH or O—CH=CH$_2$, d) poly ether derived divinyl ethers of the formulae (6) and (7):

$$R'''-(CH_2-\underset{|}{\overset{CH_3}{CH}}-O)_x-CH=CH_2 \qquad (6)$$

where
  x is 2, 3, or 4 and R''' is H, OH or —O—CH=CH$_2$, $$CH_3CH_2-C(CH_2-O-CH_2CH_2O-CH=CH_2)_3 \qquad (7)$$

and e) phenol derived vinyl ethers of the formulae (8) and (9)

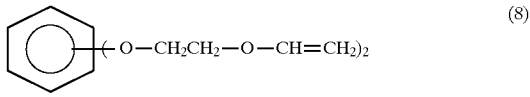

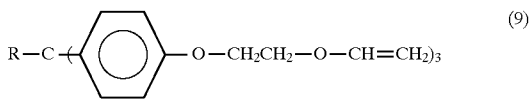

where R is H or CH$_3$.

Common vinyl ether monomers which are suitable include ethyl vinyl ether, propyl vinyl ether, isobutyl vinyl ether, octadecyl vinyl ether, hydroxybutyl vinyl ether, propenyl ether of propylene carbonate, dodecyl vinyl ether, cyclohexyl vinyl ether, 2-ethylhexyl vinyl ether, butyl vinyl ether, ethyleneglycol monovinyl ether, diethyleneglycol divinyl ether, butanediol monovinyl ether, butane diol divinyl ether, hexane diol divinyl ether, ethylene glycol butyl vinyl ether, triethylene glycol methyl vinyl ether, cyclohexane dimethanol monovinyl ether, cyclohexane dimethanol divinyl ether, 2-ethylhexyl vinyl ether, poly-THF divinyl ether, $CRH=CR-[O(CH_2)_4-O]_n-CR=CRH$, pluriol-E-200-vinyl ether, $CRH=CR-[O-CH_2-CH_2]_n-O-CR=CRH$ and the like.

Alcohols are an optional component used to modify the properties of the ink and the image obtained. Monofunctional alcohols function to terminate chain length while multifunctional (trifunctional) alcohols can provide crosslinking and can speed up the kinetics of the reaction.

Essentially, any low molecular weight (low viscosity) alcohol can be used which is soluble in the ink formulation. An additional advantage is obtained in using low boiling alcohols where the ink is to be used in thermal jet printing. Such low boiling alcohols will function as a propellant as well as participate in the polymerization. Suitable examples include ethylene glycol, polyether polyols, diethylene glycol, triethylene glycol, 1,2-propylene glycol, dipropylene glycol, 1,3-butanediol, 1,4-butanediol, neopentyl glycol, trimethylol propane, 1,6-hexanediol, pentaerythritol, trimethylol propane, tetramethylolpropane, dipentaerythritol, dihydroalcohols with a molecular weight of 3000 or less such as tone polyols

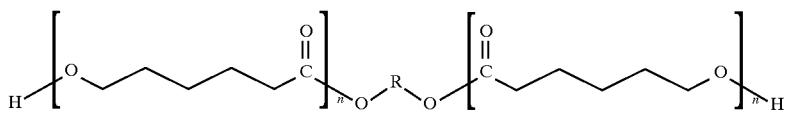

and the like.

Suitable photoinitiators include those compounds which form aprotic acids or Bronstead acids upon exposure to UV and/or visible light sufficient to initiate polymerization. These are distinguished from photoinitiators used to generate free radicals such as most quinone compounds. Most cationic UV photoinitiators absorb photon energy at a wavelength in the range of 360–450 nm. The photoinitiator used may be a single compound, a mixture of two or more active compounds or a combination of two or more different compounds, i.e., coinitiators which form part of a multi-component initiating system. For example, a combination of diaryl iodonium cation and tetrakis(pentafluorophenyl) borate anion.

The photoinitiator is preferably incorporated in an amount of from 0.01 to 10 wt. %, based on the total weight of the ink formulation, most preferably about 2 wt. % of the total ink formulation. When the amount of photoinitiator is too small, cure is insufficient and where an excessive amount is used, rapid cure results in a decrease in molecular weight and reduced smear resistance.

Examples of suitable cationic photoinitiators are listed below.

Aryldiazonium salts of the formula Ar—$N_2^+X^-$,

Diaryliodonium salts of the formulae Ar—$I^+$—Ar $X^-$, including

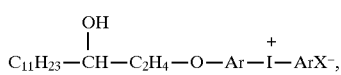

Triarylsulphonium salts of the formulae

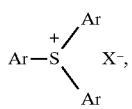

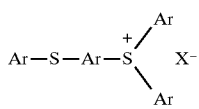

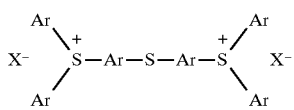

Triaiylselenonium salts of the formula

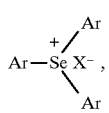

Dialkylphenacylsulphonium salts of the formula

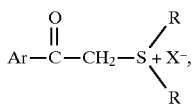

Aryloxydiarylsulphoxonium salts of the formula

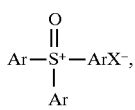

Dialylphenacylsulphoxonium salts of the formula

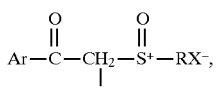

Iron Arene Complexes, Nitrobenzyl Triarylsilyl Ethers, Triarylsilyl Peroxides and Acylsilanes.

wherein Ar is phenyl or naphthyl, R is a $C_{1-10}$ hydrocarbon based moiety and X is a counter ion.

The counter ions are typically $SbF_6^-$, $AsF_6^-$, $PF_6^-$ and $BF_6^-$. Examples of suitable commercial photoinitiators are given below in Table 1.

TABLE 1

Supplier of UV and visible light photoinitiators for cationic polymerizations.

| Type of Photoinitiator | Tradename | Supplier |
| --- | --- | --- |
| Triarylsulphonium salts | Cyracure UVI-6990 | Union Carbide |
| Triarylsulphonium salts | Cyracure UVI-6974 | Union Carbide |
| Triarylsulphonium salts | Degacure KI85 | Degussa |
| Triarylsulphonium salts | SP-55 | Asahi Denka |
| Triarylsulphonium salts | SP-150 | Asahi Denka |
| Triarylsulphomium salts | SP-170 | Asahi Denka |
| Iodonium salts | CD1O12 | Sartomer |
| Iron Arene Complex | Igracure 261 | Ciba-Geigy |

Some manufacturers, such as Sartomer, provide a series of products for cationic polymerization. Those provided by Sartomer are sold under the tradename Sarcat® Cationic Products. These include epoxy monomers and photoinitiators.

A photosensitizer may be used with the photoinitiator in amounts of from 0.01 to 10 wt. %, based on the total weight of the ink formulation. A photosensitizer absorbs energy and then transfers it to another molecule, usually the photoinitiator. The structure of the photosensitizer remains unchanged. Photosensitizers are often added to shift the light absorption characteristics of a system. An example of a photosensitizer is anthracene, which is used with the diphenyliodonium cation. Suitable examples include anthracene, pery-lene, phenothiazine, xanthone, thioxanthone and benzophenone. A photopolymerization initiation assistant may also be used. This is an agent which is not activated itself by ultraviolet radiation but which, when used with a photopolymerization initiator, helps the initiator speedup the initiation of polymerization; thus, realizing a more efficient cure.

Suitable light sources for curing the ink compositions of the present invention depend on the photoinitiator used. Those responsive to visible light can be cured by ambient light from conventional incandescent light bulbs or fluorescent light bulbs. Those photoinitiators responsive to the UV light can be activated by high pressure mercury lamps, xenon-lamps, arc lamps and gallium lamps.

The ink formulations of the present invention contain a coloring agent which is capable of being sensed visually, by optical means, by magnetic means, by electroconductive means or by photoelectric means. This coloring agent is typically a dye or pigment including a variety of organic and inorganic coloring pigments and dyes. Examples include phthalocyanine dyes, carbon blacks, fluorescent naphthalimide dyes and others such as cadmium, primrose, chrome yellow, ultra marine blue, iron oxide, zinc oxide, titanium oxide, cobalt oxide, nickel oxide, etc. Other examples of coloring agents include those described in U.S. Pat. No. 3,663,278 and U.S. Pat. No. 4,923,749. Reactive dyes such as leuco dyes and diazonium compounds are also suitable. The total amount of coloring agent is typically from about 0.01–10 wt. % of the total ink formulation.

Dispersing agents may optionally be used in the ink formulation to help solubilize the pigment or dye.

Conventional fillers, defoaming agents, flow adjusters, leveling agents or cobwebbing preventative agents may also be incorporated to improve the properties as jet printing inks. Illustrative examples of flow adjusters are low molecular weight organopolysiloxanes such as methylpolysiloxanes which may be used in an amount of 0.01–10 wt. % based on weight of the total ink formulation. An illustrative example of a defoamer, i.e., a surfactant, is Anti-Musal JIC, which may be used in an amount of 0.01–10 wt. % based on the weight of the total ink formulation. Illustrative examples of leveling agents are low molecular weight polysiloxane/polyether copolymers and modified organic polysiloxanes, which may be used in an amount of 0.01–10 wt. % based on the weight of the total ink formulation.

Other suitable additives desired for jet ink printing are those which reduce bacterial growth (Towisyl 75), modify viscosity which provide wettability (butylcarbitol), humectants which prevent the composition from drying out within the print head (polyethylene glycols), which enhance the conductivity of the ink formulation for use in continuous ink jet printers and photostabilizers which prevent polymerization of inks by natural or ambient light where the photoinitiator is activated by UV radiation.

Plasticizers such as those described in U.S. Pat. No. 3,663,278, may also be used to aid flexibility of the image formed and/or reduce the viscosity of the ink. Suitable plasticizers include adipic acid esters, phthalic acid esters and ricinoleate acid esters, citrates, epoxides, glycerols, glycols, hydrocarbons and chlorinated hydrocarbons, phosphates and the like. Other suitable additives include oil, weatherability improvers such as UV light absorbers, flexibilizers (oil) and fillers.

Where the ink formulation is to be used in a thermal ink jet printer, it contains a propellant, which is typically a low boiling liquid such as a low molecular weight alcohol or water. The amount of propellant can range from 10 to 95 wt. % of the total ink formulation. Amounts above 10 wt. % can be used where the propellant participates in the reaction or evaporates on the substrate. Preferably, the propellant comprises about 75 wt. % of the total ink formulation.

The above reciped components can be mixed and dispersed uniformly by an appropriate means such as a simple impeller within a vessel or a roll mill to obtain the ink composition of the present invention.

The ink formulations of the present invention have a viscosity in the range of 1–500 cps at 25° C., preferably 1–100 cps and most preferably between 1–25 cps to allow use within conventional ink jet printers. Where the photopolymerizable monomers have a viscosity much higher than 50 cps, they are diluted with either a low viscosity co-reactant, such as alcohols described above, or a low viscosity carrier such as plasticizers or solvents (alcohols or ketones). Solvents are not preferred unless the ink is to be used in a thermal ink jet printer and the solvent functions as a propellant. Solvents typically need to be evaporated which can cause some shrinkage of the cured image and reduced adhesion to the substrate. Alcohols are preferred diluents in that they will participate in the polymerization and not reduce smear resistance.

The ink formulations can comprise over 90% photopolymerizable monomer and provide suitable printed images of a highly crosslinked polymer. The ink formulations of the present invention can comprise as little as 10 wt. % photopolymerizable monomer when diluted by a carrier (plasticizers, solvents or propellants) and provide stable images. Preferred levels will depend on the monomers used and their viscosity.

The photo-curable ink of the present invention adheres well to various substrates such as coated and uncoated paper, wood plastics, glass ceramics and metal shows no removal or peeling off from the surface caused by stress or strain and exhibits an excellent flowability to the deformation of the substrate.

The imaged substrates of the present invention include an image comprising a colorant as defined above bound to the surface of the substrate by a binder. The binder can vary significantly in composition based on the photopolymerizable monomers/oligomers used, the absence or presence of alcohols or other additives.

The ink jet printers provided by this invention incorporate the ink compositions of this invention. The printing apparatus may require a source of UV radiation to complete the cure of images produced therefrom. "On-demand" ink jet printers are preferred in that there is no concern over polymerization of a recycle stream. The "continuous" ink jet printers of this invention must operate with the recycle stream in darkness to avoid polymerization.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

EXAMPLES

Example 1

Ink Formulation

An ink formulation of the present invention is prepared by combining the following components. The photoinitiator is added last, preferably in darkness.

| Component Name | Supplier | Function | Amount |
| --- | --- | --- | --- |
| Triethylene Glycol Divinyl Ether[1] | BASF | Vinyl Ether Monomer | 0 to 60% |
| Cyracure UVR 6105[2] | Union Carbide | Epoxy Monomer | 40 to 98% |
| SarCat CD 1012[3] | Sartomer | Photoinitiator | 0.5% to 4% |
| Bromocresol Purple[4] | Aldrich | Dye | 0.1 to 2% |

1.

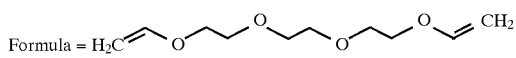

available from BASF Corporation Chemicals Division, Mount Alive, N.J. 07828-1234.

2. Chemical name=3,4-epoxycyclohexylmethyl-3,4-epoxycyclohexane carboxylate.

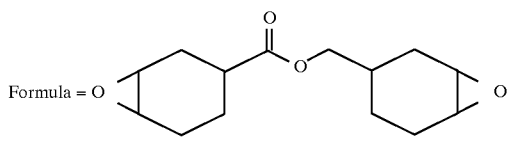

available from Union Carbide Corporation, 39 Old Ridgebury Road, Danbury, Conn. 06817-0001.

3. Formula=$C_{11}H_{23}CHOHC_2H_4O$—Ph—$I^+$—Ph—$^-SbF_6$ available from Sartomer, 502 Thomas Jones Way, Exton, Pa. 19341.

4. Chemical name=5',5"-dibromo-o-cresolsulfonephthalein.

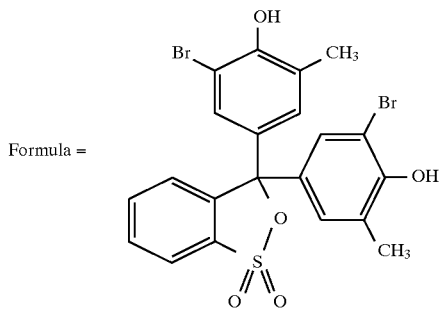

available from Aldrich, 1001 West Saint Paul Avenue, Milwaukee, Wis. 53233.

The resulting ink has a viscosity of from 10 to 200 cps.

Example 2

Imaged Substrate

A film of the ink formulation of Example 1 is applied to a glass plate with a wood applicator and is exposed to ultraviolet light from a non-doped Mercury Arc lamp at an intensity of 300 watts/in for 3 seconds, while traveling 15–20 ft./min. in a U.V. cabinet from U.V. Process Supply Inc., 4001 North Ravenswood Avenue, Chicago, Ill. 60613. The film is not tacky and shows good adhesion to the substrate.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In an ink jet printer which contains a print head that produces a stream of ink droplets to impinge on a substrate in a desired location, the improvement which comprises the use of an ink composition which comprises:

(a) at least one reactive monomer or oligomer selected from the group consisting of bifunctional epoxy monomers, bifunctional epoxy oligomers, polyfunctional epoxy monomers and polyfunctional epoxy oligomers having at least two oxirane moieties and a viscosity of less than 500 cps at 25° C. in the absence of solvent;

(b) at least one reactive monomer or oligomer selected from the group consisting of bifunctional vinyl ether monomers, bifunctional vinyl ether oligomers, polyfunctional vinyl ether monomers and polyfunctional vinyl ether oligomers having at least two functional groups of the formula —O—CR'=CRH, wherein R and R' are each independently H or $C_{1-8}$ alkyl and a viscosity of less than 500 cps at 25° C. in the absence of solvent;

(c) at least one cationic photoinitiator, and (d) at least one coloring agent selected from pigments and dyes, wherein said ink jet printing ink has a viscosity in the range of 1–200 cps at 25° C.

2. In an ink jet printing process, wherein a stream of ink droplets is produced by crystal vibrations or an electrostatic field and directed to impinge a substrate at a desired location by an electric field, the improvement which comprises the use of a printing ink comprising:

a) at least one cationically reactive monomer or oligomer selected from the group consisting of epoxy monomers, epoxy oligomers, vinyl monomers and vinyl oligomers, said epoxy monomers and oligomers having at least one functional group of the formula

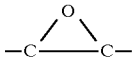

and a viscosity of less than 500 cps at 25° C. in the absence of solvent and said vinyl ether monomers and oligomers having at least one functional group of the formula —O—CH=$CH_2$ and a viscosity of less than 500 cps at 25° C. in the absence of solvent;

b) at least one cationic photoinitiator; and c) at least one coloring agent selected from pigments and dyes with a particle size of less than 5 μm, said ink composition having a viscosity in the range of 1–500 cps at 25° C., contains no solvent, contains no propellant for a thermal ink jet printer and contains no particulate matter greater than 5 μm and has a resistivity of less than 10,000 ohms/cm.

3. An ink jet printing process as in claim 2, wherein the ink jet is produced continuously.

* * * * *